United States Patent
Malcolm

(10) Patent No.: US 7,433,924 B2
(45) Date of Patent: Oct. 7, 2008

(54) INTERCEPTOR FOR NON-SUBSCRIBED BULK ELECTRONIC MESSAGES

(75) Inventor: Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 10/636,986

(22) Filed: Aug. 7, 2003

(65) Prior Publication Data

US 2005/0033810 A1    Feb. 10, 2005

(51) Int. Cl.
   G06F 15/16    (2006.01)
   G06F 15/173   (2006.01)
   G06F 15/177   (2006.01)

(52) U.S. Cl. .................. 709/206; 709/224; 709/226; 709/219

(58) Field of Classification Search ......... 709/200–206, 709/217–228
   See application file for complete search history.

(56) References Cited

U.S. PATENT DOCUMENTS

| | | | |
|---|---|---|---|
| 6,226,692 B1 | 5/2001 | Miloushev et al. | 709/316 |
| 6,330,590 B1 | 12/2001 | Cotten | 709/206 |
| 6,421,709 B1 | 7/2002 | McCormick et al. | 709/206 |
| 6,480,885 B1 | 11/2002 | Olivier | 709/207 |
| 6,484,197 B1 | 11/2002 | Donohue | 709/206 |
| 6,546,390 B1 | 4/2003 | Pollack et al. | 707/7 |
| 6,546,416 B1 | 4/2003 | Kirsch | 707/206 |
| 6,965,919 B1 * | 11/2005 | Woods et al. | 709/206 |
| 7,072,942 B1 * | 7/2006 | Maller | 709/206 |
| 7,149,778 B1 * | 12/2006 | Patel et al. | 709/206 |
| 7,219,131 B2 * | 5/2007 | Banister et al. | 709/206 |
| 2001/0055396 A1 | 12/2001 | Jevans | 380/382 |
| 2002/0107925 A1 | 8/2002 | Goldschneider et al. | 709/206 |
| 2002/0188689 A1 | 12/2002 | Michael | 709/206 |
| 2003/0009698 A1 | 1/2003 | Lindeman et al. | 713/201 |
| 2003/0041126 A1 | 2/2003 | Buford et al. | 709/220 |
| 2003/0041263 A1 | 2/2003 | Devine et al. | 713/201 |
| 2005/0044153 A1 * | 2/2005 | Gross | 709/206 |
| 2007/0005970 A1 * | 1/2007 | Trupp et al. | 713/170 |

OTHER PUBLICATIONS

"How it works—Spam Filtering" by Cyber Internet Services, downloaded on Jul. 14, 2003 from http://www.cyberis.net/info/spam/how_it_works.phtml, 3 pages.

(Continued)

*Primary Examiner*—Haresh N Patel
(74) *Attorney, Agent, or Firm*—Robert H. Frantz; Matthew B. Talpis; Mark S. Walker

(57) ABSTRACT

Bulk mail subscriptions by including a bulk mail class indicator and a sender identifier key value in the header portion of an electronic message. Messages which are properly identified as bulk class and include an approved sender identifier value are passed directly to the intended recipient. Messages which are properly identified as bulk class but which do not contain an approved sender identifier value are rejected or intercepted. Messages which do no indicate themselves to be bulk class, but which are determined to have characteristics of bulk mail are rejected or intercepted, as well.

5 Claims, 3 Drawing Sheets

OTHER PUBLICATIONS

"Whitelist-Based Spam Filtering" by Gerald Oskoboiny, downloaded on Jul. 14, 2003 from http://impressive.net/people/gerald/2000/12/spam-filtering.html, 3 pages.

"Spam Filtering & E-mail Virus Protection: How It Works", downloaded on Jul. 14, 2003 from http://www.ipop.com/Solutions/EmailFiltering/HowItWorks.asp; 3 pages.

* cited by examiner

INTERCEPTOR FOR NON-SUBSCRIBED BULK ELECTRONIC MESSAGES

BACKGROUND OF THE INVENTION

1. Field of the Invention

This invention relates to the fields of filtering, sorting, prioritizing and rejecting electronic messages such as e-mail.

2. Background of the Invention

Bulk electronic messaging such as mass mailings of electronic newsletters, advertisements, business announcements, etc., can be categorized from a recipient's viewpoint as "solicited" and "unsolicited". Solicited messages are messages which the recipient expects or has requested to be sent, such as subscription information services, news alerts, etc. A recipient of these messages has usually registered for the messages, such as having been added to an "opt-in" mailing list.

Unsolicited messages are messages which the recipient has not requested, but which have been sent to the recipient by a source which may or may not be known to the recipient, such as advertisements, scam messages, promotional messages, etc.

"Spam" is an inexact term used by system operators, bulk mail senders (e.g. authors), and recipients, alike. It generally refers to messages which are sent in bulk (e.g. many recipients for the same message), and which is undesirable. Depending on the recipient's view of the message itself, it may or many not be "spam". For example, consider that an online book seller provides each user of its e-commerce website the option to be sent messages about "special offers" and from "selected partners". For one particular user, if messages for such "special" offers are received daily or even multiple times per day, the recipient may consider the messages "spam", even though he or she elected to be part of the mailing list. In another example, the recipient may consider a message to be "spam" from a travel company associated with the book seller (e.g. a "selected partner") because he or she did not expect to receive any messages other than book-related messages, while another recipient in the mailing list may appreciate the contact with the travel company.

So, depending on the content of the message, the historical context under which a message is sent from an author to a recipient, and the perspective of the recipient, a bulk mail message may or may not be considered "spam".

FIG. 1 illustrates in general a bulk mailing arrangement (10), such as bulk email processes. A number of intended or targeted recipients (14) are interconnected to a source or sender (12) via a computer network (11). In the most common case of bulk electronic messaging, the sending server (12) is a Simple Mail Transfer Protocol ("SMTP") server, the computer network (11) is the Internet, the receiving servers (13a, 13b, and 13c) are Post Office Protocol ("POP") servers, and the recipients are email terminals (e.g. personal computers, personal digital assistants, web-enabled wireless telephones, etc.) having unique email addresses. Other arrangements may use other protocols and equipment such as the Short Message Server ("SMS") used by many cellular telephones, text pagers, proprietary messaging schemes, and even facsimile transmissions.

In this arrangement, the sending server (12) accesses one or more mailing lists (15) which contains addresses of recipients (14) to which a particular bulk mail message is to be sent. In some cases, the mailing lists (15) may be sophisticated database entries for each possible recipient, including information about that recipient to help determine if the message should be sent or not (e.g. user's interests, key words, subjects, etc.). In other cases, the mailing list may be as simple as a list of email addresses, all of which are sent every bulk mail message.

The sending server (12) then composes a single message designating multiple recipients, or multiple messages each of which designates a single recipient from the mailing list. The message(s) are then transmitted via the computer network (1) to one or more receiving servers (13a, 13b, 13c), ultimately for delivery to the intended recipients (14).

Some spam filters have been brought to the market to help solve this problem in recent years. The general approach has been to detect a pattern that identifies a message as spam. Some spam filters "execute" or run at the receiving server's point in the process, using the ability to survey across multiple user's mailboxes to look for certain patterns, as well as being able to look at messages in individual mailboxes for patterns and to apply each user's specific preferences. Other filters run on the recipient's device, such as within the user's PC or PDA, blocking display or download of certain messages based upon various factors.

Most messages, and especially SMTP email messages, are comprises of several parts, including generally:

(a) a "header" which includes a source designator, a recipient designator, a format or protocol designator, time and routing information, and often a "subject" or summary field;

(b) a "body" or message portion containing the actual message such as text, Hyper Text Markup Language ("HTML") or other data; and (c) optional attachments and/or quoted information from other sources (e.g. forwarded text).

Using defined spam patterns, a spam filter can search the inbound email, including headers, subject line, and the message body, for any of the identified patterns. If one of these patterns is found, then the filter moves the message into a special folder such as a "look at later" folder, or deletes the message altogether, usually depending on the intended recipient's preferences.

Some spam filtering systems use a "whitelist/blacklist" scheme. According to this approach, each user configures a "whitelist" (16) of senders from which the user will accept or desires bulk messages. The blacklist (not shown) is a list of senders for whom all messages should be blocked or rejected. Some messages from unknown senders, of course, will not fit with either list, and must be handled "normally".

Such a whitelist is usually integrated with a user's address book. For example, Yahoo!'s email server allows each user to set up or configure a personal address book so he doesn't have to remember the email address for each person with whom he keeps correspondence. Yahoo! also provides an option on their email server that allows the user to accept all messages which are sent from addresses currently in his or her address book. This option creates a whitelist, though it is invisible to the user.

A user may also manually create a whitelist outside of his address book in some systems. This method is generally used to receive newsletters or any bulk-email to which the user has subscribed.

The blacklist, as the name would imply, is the opposite of the whitelist. This list is used to indicate addresses from whom email should always be regarded as spam. Many servers use a server-wide blacklist such that once a sender has been identified as a spammer, the server will block messages from that sender for all recipients served by that receiving server, unless a particular user has added the sender to his whitelist. The blacklist is not highly effective though, as bulk email senders change their source addresses quite frequently, making it difficult to track and block them.

While using a whitelist and a blacklist to simply check for individual senders can eliminate some spam message, most users still want more accuracy. Some users configure a few simple filters, in addition to enabling a whitelist. Most email client software programs such as Netscape Messenger allow the ability to set up filters locally. There are also a variety of third-party products that integrate with many popular email clients, including Microsoft Outlook and Outlook Express.

The local filter is set up to check for a specific pattern in a specific portion of the message. For example, a commonly used filter may check for words from a pornographic or objectionable word list, which appear in the subject and/or the message body. Another filter setting may reject messages which have a high number of recipients in the "to" field, or which purport to be a "Reply" to a thread of discussion which does not exist in the user's mailbox.

When these two methods are combined together, a user can eliminate quite a bit of spam, and unfortunately, some "good" messages, as well. For example, consider a user who works in research for space vehicles at a major university. If he sets a filter rule on his email client program, or if the university's information technology ("IT") department enables a filter for a objectionable word list which includes the word "sex" and variations of it, he may not receive legitimate messages having the subject "Mars Explorer", as it contains a string variant " . . . s ex . . . ". This could potentially be catastrophic for the user, as he may miss a very important email.

Consequently, users and technology developers in the industry are still searching for a perfect answer to block spam. The problem is, cleverly designed spam purposely mimics good email so that either:

(a) The filters are too weak to catch it all, or
(b) The filters are too tight and after the user misses real mail a couple of times, they turn off the filter cause they can't afford to possibly miss good mail.

U.S. Pat. No. 6,266,692 to Greenstein provides limited functionality to process email which is received from a known or trusted source. According to this method, each "known" sender of email is provided a "passcode" by the recipient. When the known or trusted sender authors a new message, the message is augmented to include the passcode in its header. When the message is received by the recipient (or by the recipient's mail server), messages having correct passcodes associated with the senders are forwarded directly to the recipient, and messages with incorrect passcodes are blocked or set aside for later review.

While this method is useful for some types of bulk mail, it presents some challenges and limitations in some situations. For example, each mail list management program (e.g. bulk mail sending program) must remember individualized passcodes for each user. Additionally, passcodes may be inadvertently disclosed by a sender by including the passcode in a header to a message to another recipient. Additionally, the recipient must manage and issue the passcodes.

Therefore, there is a need in the art for a system and method which ensures that good or desirable bulk messages are guaranteed to be delivered to the user.

SUMMARY OF THE INVENTION

Disclosed is a system that allows the user to keep a list of subscription sender ID codes for bulk mail senders to which the user has truly subscribed. Each user's approved subscription source list contains an identifier that correlates to the subscription source. Each message sent from an approved bulk mail sender must include an identifier as "bulk mail", and must include the sender's assigned identifier value, in order for the invention to pass the message directly to the recipient without interception. Any bulk mail that does not have the associated identifier in the user's environment is handled as spam. Each identifier is personalized to each subscriber to prevent spoofing by spammers. New laws and/or policy may assist in identifying bulk mail that will require these identifiers to be accepted.

BRIEF DESCRIPTION OF THE DRAWINGS

Preferred embodiments of the present invention will now be described, by way of example only, with reference to the accompanying drawings in which.

DESCRIPTION OF THE INVENTION

Figure 3:
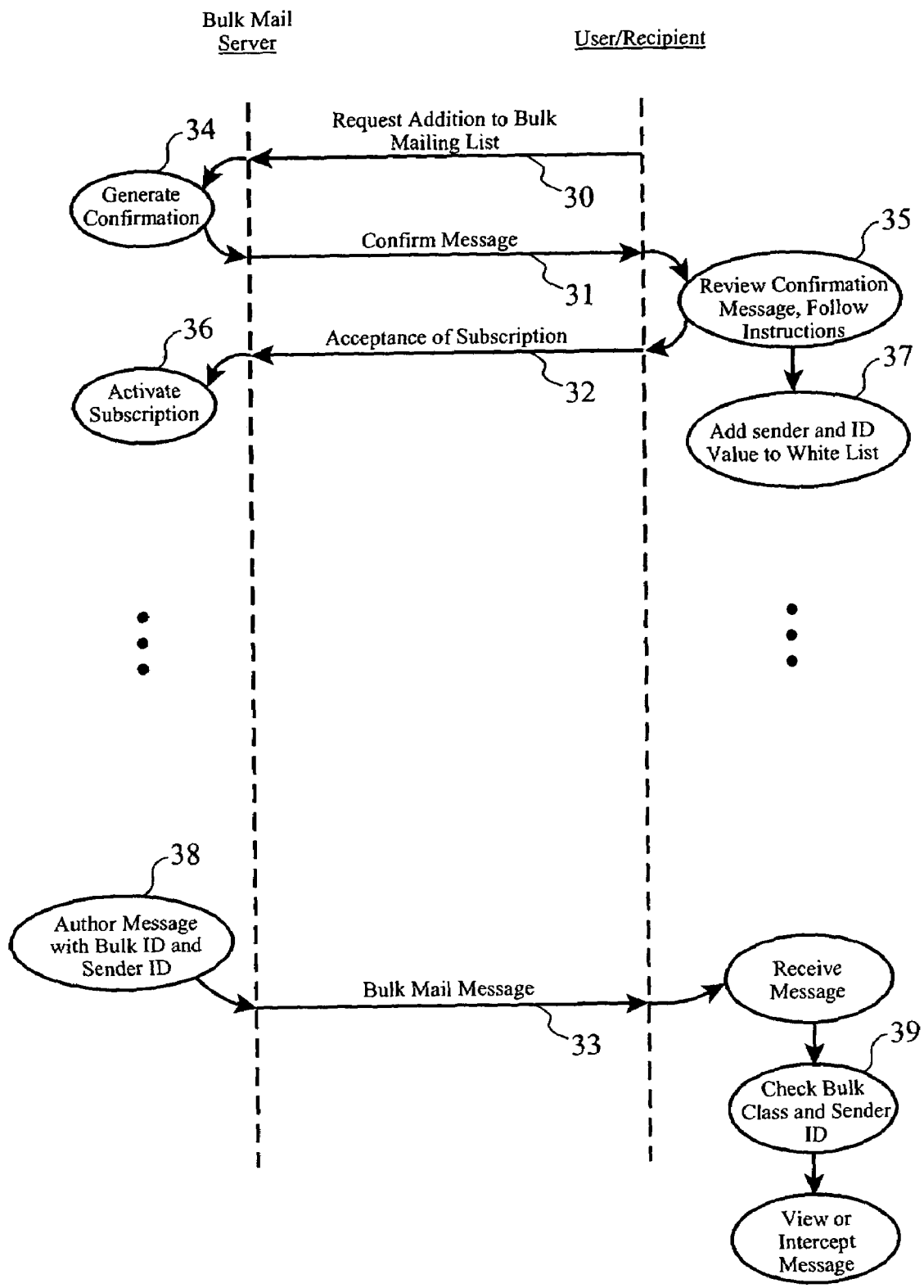
FIG. 3 illustrates the process of establishing identification values between a subscriber and a bulk mail sender.

According to our invention and shown in FIG. 3, when a user "signs up" (33) to receive messages as part of a bulk mailing service, the sending server will first generate (34) and send (31) a confirmation message to the requesting user. The confirmation message requires (35) the user to reply (32) to the confirmation before the subscription is activated (36). During this process, either during the original request (30) to be added to a mailing list, in the confirmation (31), or in the acceptance reply (32), an identifier value associated with the bulk mail sender is established and associated with an entry for the sender in the user's whitelist (37). Then, when subsequent bulk mail messages are authored (38), their headers are modified to include an indicator that the message is a bulk message and the identifier associated with the sender. The message is sent (33) to the recipient, and the identifier is verified (39) before it is placed in a folder for viewing by the user.

For example, the bulk mail provider can provide a field in the form which is presented to the user during the initial registration process which allows the user to select the identifier value to be associated with the bulk mail provider. Alternatively, the bulk mail provider could provide an identifier in the confirmation message (31) as part of an enhanced service to the user, or may request that the user establish the identifier of his or her choice in the acceptance reply (32). Preferably, the identifier is embodied similarly to a "cookie" within the message header, and it contains relevant information for the email subscription.

A user interface or dialog is provided to the user to allow storing of the sender's identifier, and association of the identifier with an entry in the user's whitelist. The dialog may be provided by the user's local email client software, or by the user's receiving email server. For example, if the sending server automatically selects the identifier, it can send that in a special header value in the confirmation message to the user. A receiving server script or program then detects the header fields, and notifies the user of the new subscription status, requesting the user to approve adding the sender's identifier to the user's whitelist. If the user approves, then his or her whitelist is updated accordingly. If the user rejects the offer, the user's blacklist may be updated to block further message reception from the sender.

Table 1 shows an example embodiment of an SMTP message header which contains our new bulk-class mail identifier, and the sender identifier. In this unread message, a mail class of "bulk" is indicated, and the bulk sender's identifier value of "XYZONW123" is proposed for a user "Bob Smith" at email address user01@myispservice.net.

TABLE 1

Example SMTP Header with Bulk Class and Sender Identifiers

```
From - Wed Jun 25 14:26:23 2003
X-UIDL: Jdfkc345Dsl34kKif
X-Mozilla-Status: 0002
X-Mozilla-Status2: 10800000
Status: U
Return-Path: <list_admin@xyz-online-news-watch.com>
Mail-Class: Bulk
Bulk-Sender-ID: XYZONW123
Subject: Confirmation of New Subscription to XYZ Online News Watch
To: Bob Smith <user01@myispservice.net>
From: List Administrator <list_admin@xyz-online-news-watch.com>
...
<<Message Content explaining how to approve the subscription
activation>>
```

Through the provided user dialog, the user may accept the subscription confirmation by following the instructions in the message on how to reply (e.g. clicking a hyperlink, etc.), and the system will automatically add the sender's address (e.g. list_admin@xyz-online-news-watch.com) to the user's address book or whitelist if it is not already entered, and associate the sender's identification value (e.g. XYZONW123) with that entry.

Subsequently authored and transmitted messages from the bulk mail sender server should include the bulk mail class identifier and the assigned identifier in the message header, as shown in Table 1, also.

Figure 1:
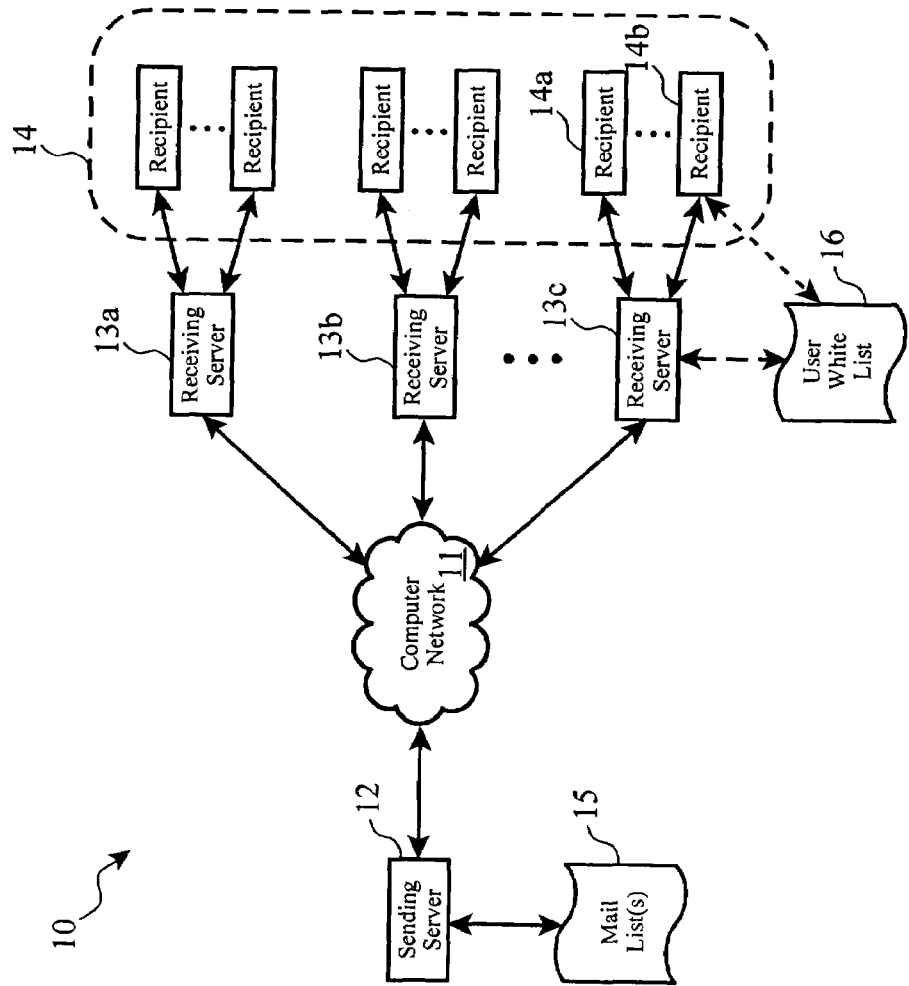
FIG. 1 illustrates the well known arrangement for bulk messaging such as bulk email transmission and reception over the Internet.
Figure 2:
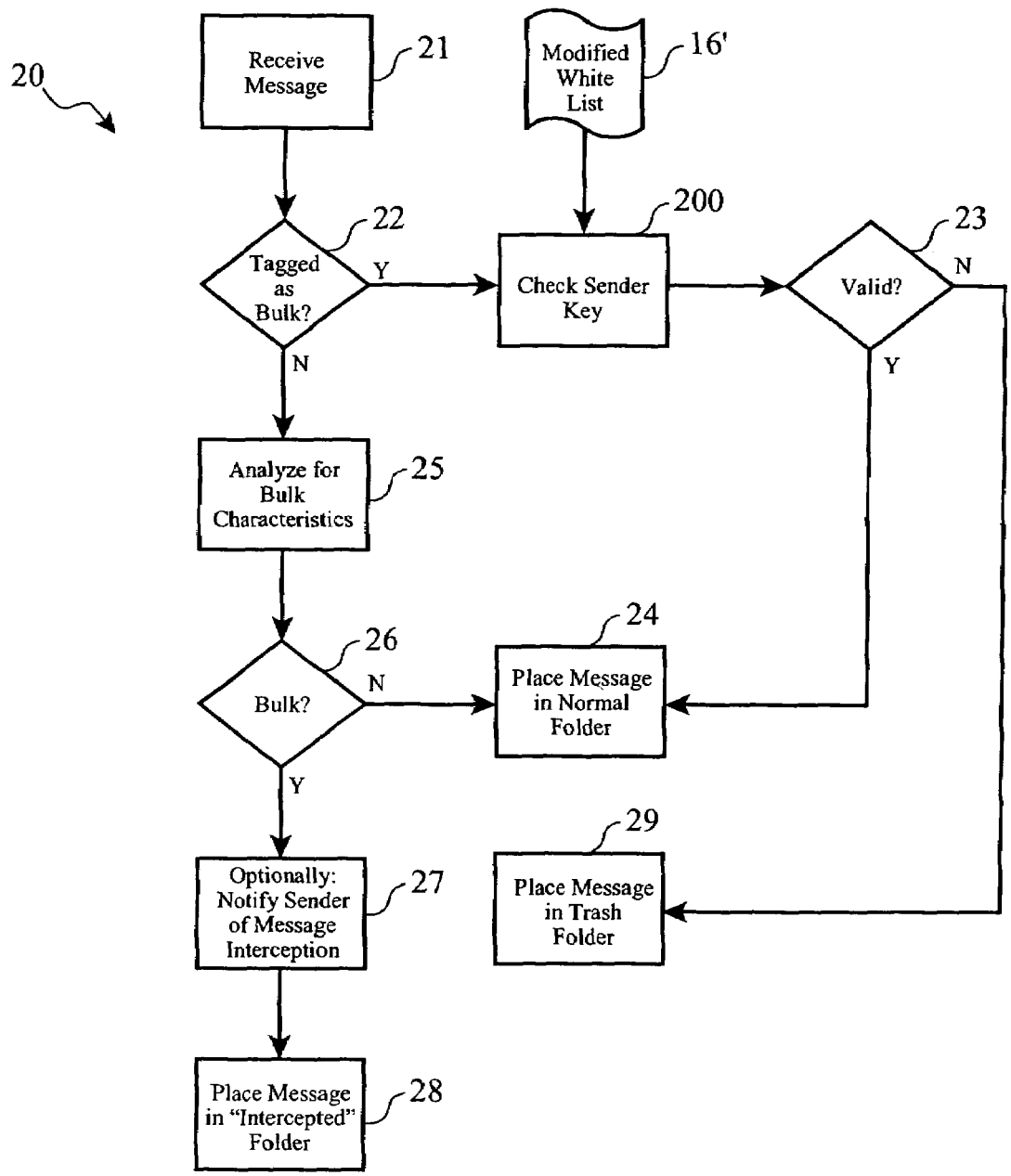
FIG. 2 depicts the logical process of the present invention to intercept bulk mail messages from unapproved sources.

Turning to FIG. 2, the generalized logical process (20) according to the invention is shown, which may be implemented and executed by the recipient's email client, by the recipients receiving mail server (e.g. the POP server), or a combination of both.

When a new message is received (21), it is first examined (22) for the bulk class indicator in its header. If it is indicated as bulk class mail, then the sender's identification value contained in the header is checked (200) against the identifier value associated with the user's enhanced whitelist (16'). If the sender identifier contained in the message header matches (23) that associated with the user's whitelist, the message is placed in the user's normal or high priority inbox folder.

However, if the message is not marked as bulk class, then the message is analyzed (25) for characteristics of bulk mail in order to catch messages from uncooperative senders, false senders, etc. Such characteristics may include, but are not limited to:

(a) an excessive number of recipients contained in the message "To" field;
(b) containing objectionable strings or words;
(c) containing strings or phrases such as "To unsubscribe . . . " which are often placed within bulk mail messages;
(d) containing highly similar or identical text as other messages in other user's inboxes; or
(e) having been transmitted within a short amount of time as an excessive number of other messages sent from the same sending server (e.g. having been sent in a burst of messages from a sending server).

If it is determined (26) that the message has characteristics of bulk mail even though it is not marked as such, then an optional message may be sent (27) to the sender to notify them that the user does not accept bulk messages without first obtaining a sender identifier from the user, and that the message has been intercepted from delivery to the intended recipient. Then, the message may be moved or stored in a folder for holding intercepted messages, where the user may review them at a later time or date.

If the message does not have characteristics of bulk mail, then it is forwarded to the "normal" or high priority folder for the recipients immediate viewing.

Using our invention, currently available spam filters can detect spam as they usually do, but with much tighter constraints. If our bulk mail details are included in a message header and it matches the approved list, the message is passed to the recipient. If the bulk mail header details exists and they don't match the user's approved list, or if there is no bulk mail header details at all but it appears to be a bulk-mailed message, the spam is rejected.

To prevent spoofing (i.e. including an identifier for a commonly accepted subscription site that there is a good chance you have approved), the bulk mail header details may optionally contain a unique identifier for each user which is known only to the sender and recipient.

As the invention may be realized with a wide variety of messaging and communications systems having many different hardware platforms and protocols, those skilled in the art will readily recognize that many variations may be taken from the example and preferred embodiments disclosed herein without departing from the spirit and scope of the present invention. The scope of the present invention should therefore be determined from the following claims.

What is claimed is:

1. A method of intercepting unwanted electronic bulk mail messages comprising:

examining a header portion of an electronic message destined to an intended recipient to find a bulk class indicator;

responsive to finding said bulk class indicator, further examining said header portion to find an approved sender identifier value;

responsive to finding both a bulk class message indicator and an approved sender identifier value, forwarding said message to said intended recipient, including said header portion with said bulk class indicator;

responsive to finding a bulk class indicator but not finding an approved sender identifier, intercepting the message by blocking forwarding of the message to said intended recipient;

responsive to finding no indication of said bulk class indicator, analyzing said message for bulk message characteristics comprising a step selected from the group of detecting a number of recipients contained in the message recipient list exceeding a pre-determined limit, detecting previously determined objectionable strings or words in the message, detecting instructions in the message regarding how to unsubscribe, detecting text within the message which is similar to message content contained in other messages addressed to recipients other than said intended recipient, and detecting a plurality of messages sent within a pre-determined period of time from a same sender; and responsive to determination that the message has bulk message characteristics, intercepting the message.

2. The method as set forth in claim 1 wherein said step of examining a header portion of a message comprises examining a Simple Mail Transfer Protocol message header.

3. The method as set forth in claim 1 wherein said step of forwarding the message to said intended recipient responsive to determining that said header contains an approved sender identifier value further comprises checking a whitelist for said intended recipient.

4. The method as set forth in claim 1 wherein said step of intercepting the message comprises deleting the message.

5. The method as set forth in claim 1 wherein said step of intercepting the message comprises storing the message in a low priority folder.

* * * * *